US009829030B2

(12) United States Patent
Dobbin et al.

(10) Patent No.: US 9,829,030 B2
(45) Date of Patent: Nov. 28, 2017

(54) INJECTABLE CAP (71) Applicant: AIRBUS OPERATIONS LIMITED, Bristol (GB)

(72) Inventors: Richard Dobbin, Bristol (GB); David Liversage, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 228 days.

(21) Appl. No.: 14/785,197

(22) PCT Filed: Apr. 16, 2014

(86) PCT No.: PCT/GB2014/051192
§ 371 (c)(1),
(2) Date: Oct. 16, 2015

(87) PCT Pub. No.: WO2014/170672
PCT Pub. Date: Oct. 23, 2014

(65) Prior Publication Data
US 2016/0069376 A1 Mar. 10, 2016

(30) Foreign Application Priority Data

Apr. 19, 2013 (GB) .................................. 1307134.5
Sep. 25, 2013 (GB) .................................. 1316990.9

(51) Int. Cl.
A47G 3/00 (2006.01)
F16B 33/00 (2006.01)
(Continued)

(52) U.S. Cl.
CPC ............ F16B 33/004 (2013.01); B64D 45/02 (2013.01); F16B 37/14 (2013.01); F16B 11/006 (2013.01)

(58) Field of Classification Search
CPC ...... F16B 11/006; F16B 33/004; F16B 37/14; A47G 3/00; B64D 45/02
(Continued)

(56) References Cited

U.S. PATENT DOCUMENTS 2,710,113 A 6/1955 Pritchard
4,905,931 A 3/1990 Covey
(Continued)

FOREIGN PATENT DOCUMENTS

DE 102005030817 A1 1/2007
EP 0334011 A1 9/1989
(Continued)

OTHER PUBLICATIONS

International Search Report dated Aug. 28, 2013 in International Application No. PCT/GB2013/051274, filed May 17, 2013.
(Continued)

Primary Examiner — Roberta Delisle
(74) Attorney, Agent, or Firm — Hauptman Ham, LLP (57) ABSTRACT The present invention proposes a cap for forming a sealed cavity around one end of a fastener to thereby contain out-gassing and sparking events in the event of a lightning strike to the fastener. The invention also proposes a joint comprising such a cap, and a kit of parts and method for installing such a cap. A cap according to the invention comprises: an inner cap member having an annular base terminating at an edge which surrounds an opening into an air cavity for enclosing the one end of a fastener; and an outer cap member having an annular skirt or flange which extends radially outwardly away from the annular base, the annular skirt or flange and annular base between them defining an annular sealing cavity. The cap also comprises a sealing material inlet comprising an opening in the outer cap member that is in fluid communication with the annular
(Continued)

sealing cavity, the opening being arranged to interconnect with a sealing material injection device to provide a flow of curable sealing material from the sealing material inlet into the annular sealing cavity. The outer cap member has an inner surface formed with a first locking feature, and the inner cap member has an outer surface formed with a second locking feature which forms a snap-fit joint with the first locking feature.

16 Claims, 11 Drawing Sheets

(51) Int. Cl.
    *B64D 45/02*     (2006.01)
    *F16B 37/14*     (2006.01)
    *F16B 11/00*     (2006.01)

(58) Field of Classification Search
    USPC .......... 411/82.1, 337, 372.5–372.6, 373, 377
    See application file for complete search history.

(56) References Cited

U.S. PATENT DOCUMENTS

| | | | |
|---|---|---|---|
| 5,419,666 | A | 5/1995 | Best |
| 2012/0074257 | A1 | 3/2012 | Bessho et al. |
| 2012/0219380 | A1 | 8/2012 | Hutter, III |
| 2013/0322982 | A1 | 12/2013 | Dobbin |
| 2015/0184688 | A1 | 7/2015 | Dobbin et al. |

FOREIGN PATENT DOCUMENTS

| | | |
|---|---|---|
| FR | 2626629 A1 | 8/1989 |
| WO | 2012107741 A1 | 8/2012 |
| WO | 2012118855 A2 | 9/2012 |
| WO | 2013178985 A1 | 12/2013 |

OTHER PUBLICATIONS

Written Opinion dated Aug. 28, 2013 in International Application No. PCT/GB2013/051274, filed May 17, 2013.
UKIPO Search Report dated Sep. 13, 2012 in GB Application No. 1209724.
UKIPO Search Report dated Sep. 24, 2013 in GB Application No. 1307134.5.
UKIPO Search Report dated Mar. 4, 2014 in GB Application No. 1316990.9.
International Search Report dated Aug. 1, 2014 in International Application No. PCT/GB2014/051192, filed Apr. 16, 2014.
Written Opinion dated Aug. 1, 2014 in International Application No. PCT/GB2014/051192, filed Apr. 16, 2014.

INJECTABLE CAP

RELATED APPLICATIONS

The present application is a National Phase of International Application Number PCT/GB2014/051192, filed Apr. 16, 2014, and claims priority from Great Britain Application Number 1307134.5, filed Apr. 19, 2013 and Great Britain Application Number 1316990.9, filed Sep. 25, 2013.

FIELD OF THE INVENTION

The present invention relates to a cap for forming a sealed cavity around one end of a fastener, a joint comprising such a cap, and a kit of parts and method for installing such a cap.

BACKGROUND OF THE INVENTION

A known method of providing spark suppression around a fastener is described in EP-A-0334011. A volume of gas is enclosed by a cap around the fastener. The gas provides spark suppression for arcing that may occur between the composite structure and the metal fastener during any lightning strike.

SUMMARY OF THE INVENTION

A first aspect of the invention provides a cap for forming a sealed cavity around one end of a fastener, the cap comprising: an inner cap member having an annular base terminating at an edge which surrounds an opening into an air cavity for enclosing the one end of a fastener; an outer cap member having an annular skirt or flange which optionally extends radially outwardly away from the annular base, the annular skirt or flange and annular base between them defining an annular sealing cavity; and a sealing material inlet comprising an opening in the outer cap member that is in fluid communication with the annular sealing cavity, the opening being arranged to interconnect with a sealing material injection device to provide a flow of curable sealing material from the sealing material inlet into the annular sealing cavity. The outer cap member has an inner surface formed with a first locking feature, and the inner cap member has an outer surface formed with a second locking feature which forms a snap-fit joint with the first locking feature.

The inner and outer cap members are joined together by a snap-fit joint which prevents inadvertent disassembly and holds the outer cap member in place during injection and curing of the sealing material.

In one embodiment the first locking feature is an annular projection in the inner surface of the outer cap member and the second locking feature is a recess in the outer surface of the inner cap member which receives the annular projection to form the snap-fit joint.

Preferably the inner cap member is formed with a plurality of locking features each forming a respective snap-fit joint with a locking feature in the outer cap member. A plurality of flow channels are provided between the snap-fit joints to enable the curable sealing material to flow into the annular sealing cavity between the snap-fit joints.

Optionally the outer surface of the inner cap member is formed with a plurality of second locking features each forming a respective snap-fit joint. In some embodiments a plurality of channels are formed in the outer surface of the inner cap member, each channel being in fluid communication with the opening of the sealing material inlet and the annular sealing cavity. The channels are separated by ridges which abut the inner surface of the outer cap member, and each one of the plurality of second locking features is formed in a respective one of the ridges.

The first locking feature may extend around a full circumference of the inner surface of the outer cap member. In the case where the outer surface of the inner cap member is formed with a plurality of second locking features each forming a respective snap-fit joint, these snap-fit joints may be formed with a common first locking feature which extends around the full circumference of the inner surface of the outer cap member.

Preferably the first and/or second locking feature is an asymmetrical locking feature, for instance comprising an angled ramp and an undercut which meets the ramp at a corner. Typically an undercut of the first locking feature mates with an undercut of the second locking feature to form the snap-fit joint.

The annular base of the inner cap member typically has a cylindrical outer surface.

The inner cap typically comprises a domed portion, and a shoulder between the annular base and the domed portion where an outer diameter of the inner cap reduces.

The shoulder and the domed portion typically have outer surfaces which meet at a concave corner, and the shoulder and the annular base typically have outer surfaces which meet at a convex corner.

The second locking feature may be formed in the domed portion.

The inner cap member preferably comprises a substantially dome-shaped portion extending from the annular base, and the outer cap member preferably comprises a corresponding substantially dome-shaped portion extending from the annular skirt or flange. The dome shape of the outer cap member reduces the likelihood of damage to the cap e.g. by accidental knocking by an assembly worker, and minimises stress concentrations. The dome shape of the inner cap member enables the volume of the air cavity to be minimised, and therefore minimises the overall size and mass of the cap. The dome shape thus maximises the air cavity volume for a given weight and space envelope.

Since the sealing material can be injected via the sealing material inlet after positioning of the cap onto an end of a fastener it is possible to use sealing materials with short handling and curing times. The sealing material can be mixed in the sealing material injection device on application, thus ensuring that the material is applied during its working life and before it has started to cure. Quick cure sealing materials have the advantage of providing a stable bond very quickly. That is, the installed cap will be able to withstand accidental knocks or similar from assembly workers within a short timeframe.

The annular sealing cavity provides a large contact area for the seal which in turn provides a strong, reliable bond between the cap and structure in a relatively small footprint area. A good seal between the cap and structure is essential, both to maintain a sealed volume of air within the air cavity so that the air cavity can safely contain out-gassing and sparking caused during a lightning strike, and to prevent leakage of fuel into the air cavity.

The cap of the present invention also prevents air gaps within the cured seal, and provides for a clean and consistent application process. It is particularly important to prevent air gaps in the sealing material since such air gaps compromise the seal (bond line) and thereby permit fuel leakage into the air cavity.

Sealing material within the annular sealing cavity has a primary function of sealing the air cavity when the nut cap is installed over a fastener passing through a structure, but may also have a function of bonding the cap to the structure. Thus, the sealing material may comprise a sealing and bonding material. Similarly, the annular sealing cavity may comprise an annular sealing and bonding cavity.

The opening of the sealing material inlet is preferably centred on a central axis of the outer cap member. Such a central position ensures an even flow to the whole circumference of the annular sealing cavity. Alternatively, the opening may be offset from the central axis in some embodiments in order to enable installation of the cap in confined spaces. It may be necessary in such cases to incorporate additional restriction features or other features into the cap to ensure that the flow of sealant material is able to provide an even seal (bond line).

The cap may further comprise a reservoir arranged to receive curable sealing material from the opening and distribute it to the annular sealing cavity. The reservoir may comprise an open-topped chamber axially aligned with (i.e. positioned directly beneath) the opening. Once filled with sealing material, the reservoir may be arranged to overflow via a peripheral edge (i.e. upper edge) to provide a uniform flow of sealing material in all radial directions.

The cap may comprise a plurality of channels formed in either an outer surface of the inner cap member or an inner surface of the outer cap member, each channel being in fluid communication with the opening of the sealing material inlet and the annular sealing cavity.

The channels may be shallow channels which extend over only part of the gap between the inner and outer cap members—the rest of the gap providing a continuous interfay region. More preferably either: the channels are formed in the outer surface of the inner cap member and separated by ridges which abut the inner surface of the outer cap member; or the channels are formed in the inner surface of the outer cap member and separated by ridges which abut the outer surface of the outer cap member. Thus in this case the ridges divide the gap between the inner and outer cap members into a plurality of channels and do not permit the sealing material to flow between the channels.

Typically each channel has a channel inlet arranged to receive the flow of curable sealing material from the sealing material inlet and an outlet arranged to feed the flow of curable sealing material into the annular sealing cavity. The channels may run all the way to the edge of the annular base of the inner cap member, but more preferably the outlets of the channels are set back in an axial direction from the edge of the annular base of the inner cap member.

The inner cap member may comprise a shoulder joining the annular base to a smaller diameter outboard portion, and the outlets of the channels may be set back in the axial direction from the shoulder or adjacent to the shoulder.

The inner or outer cap member may be formed with channels on one side only, but more preferably the inner or outer cap member has a corrugated shape. That is, either: the channels are formed in an outer surface of the inner cap member and a plurality of corresponding channels are formed in an inner surface of the inner cap member; or the channels are formed in an inner surface of the outer cap member and a corresponding plurality of channels are formed in an outer surface of the outer cap member. Forming the inner or outer cap member with such a corrugated shape enables relatively narrow channels to be formed without resulting in a large amount of extra weight.

The inner or outer cap member typically has side walls forming the channels with a substantially uniform wall thickness. This minimises the weight of the cap.

Each channel may have a width which increases as it extends towards the annular sealing cavity. This encourages the separate streams of sealing material from the different channels to merge as they exit the channels.

Each channel may have a depth which decreases as it extends towards the annular sealing cavity.

Preferably, the annular skirt or flange of the outer cap member terminates at an edge, the edge of the annular skirt or flange being offset in an axial direction from the edge of the annular base of the inner cap member. That is, when the cap is in place with the end of the fastener enclosed within the air cavity and the edge of the inner cap member abutting the structure through which the fastener passes, there will usually be a gap between the edge of the annular skirt or flange and the structure. This gap enables sealing material to flow out from the annular sealing cavity so that it forms a visible ring around the cap, thus providing a visual indication of a complete and uniform seal. The offset edge also enables the cap to be fitted to structures which have a raised region such as a fillet radius or step close to the edge of the inner cap member.

The inner cap member and outer cap member are formed as separate parts, cured sealant after assembly optionally bonding one to the other. By forming the two members as separate parts the manufacturing process is considerably simplified. The inner and outer cap members may be formed by injection moulding, preferably from a thermoplastic material such as a glass-filled polyetherimide (PEI). A suitable glass-filled PEI is Ultem™ 2400, which includes 40% glass fibres by volume.

Optionally the outer cap member is transparent in order to observe the sealing material as it is injected.

The annular sealing cavity may have a generally flared shape such that its cross-sectional area decreases with distance from the edge of the annular base. Thus, the area of sealing material in contact with the structure to which the cap is to be bonded can be maximised without increasing the overall diameter of the cap. The annular skirt or flange thus preferably extends radially outwardly from the annular base at an acute angle to the annular base. Alternatively the annular skirt or flange may extend radially outwardly from the annular base at a right angle to the annular base.

The annular skirt or flange may extend radially outwardly from the annular base along its full length. Alternatively the annular skirt or flange may comprise a cylindrical portion which extends parallel with the annular base, and a shoulder which extends radially outwardly from the annular base and joins the cylindrical portion to an outboard portion of the outer cap member (which may be domed). The shoulder may extend radially outwardly from the annular base at an acute angle to the annular base, or at a right angle to the annular base.

The sealing material inlet may comprise a projection (such as a boss) in the outer cap member, the projection containing the opening and being arranged to interconnect with the sealing material injection device.

The annular parts of the cap (that is, the annular base, the annular skirt or flange, and the annular sealing cavity) may have a generally circular shape in cross-section, or they may be any other closed shape in cross-section such as hexagonal or square (for instance to enclose a fastener with a hexagonal or square shape).

A second aspect of the present invention provides a joint comprising: a structure; a fastener passing through the structure; a cap according to the first aspect, wherein the air cavity of the inner cap member encloses an end of the fastener and the edge of the inner cap member abuts the structure; and sealing material filling the annular sealing cavity of the cap and contacting the structure to seal the air cavity.

The sealing material within the annular sealing cavity thus serves to maximise the seal (bond) thickness and the leak path length between the outside of the seal (bond) and the air cavity (inner cavity).

In preferred embodiments the sealing material (or sealing and bonding material) fills the annular sealing cavity to also bond the cap to the structure. The bond between the cap and the structure is thus formed by the cap-sealant material bond and the sealant material-structure bond.

A cap according to the first aspect may enclose each end of the fastener, so that the joint is sealed from both sides of the structure.

The structure is preferably a structural component of an aircraft, more preferably a structural component of an aircraft wing, and most preferably a structural component of an aircraft wing which forms a boundary wall of a fuel tank. The structure preferably comprises a composite structural component, and the fastener may be a metal fastener. In such cases a lightning strike may be particularly likely to occur at the fastener. The structure typically comprises a pair of structural parts which are joined together by the fastener. In such aircraft applications the air cavity of the cap provides an air pocket within which controlled out-gassing or sparking events can safely occur in the event of a lightning strike. The sealing material also provides a fluid tight seal around the end of the fastener, thus preventing fuel leakage through the hole in the structure through which the fastener passes.

The sealing material preferably comprises an epoxy based adhesive, most preferably a two-part epoxy based structural adhesive such as Scotch-Weld™ 7256 B/A, produced by 3M™. Such epoxy based materials are normally used in applications in which its primary (or sole) purpose is to act as an adhesive, but in the present invention it acts as both an adhesive and a sealant. Such two-part adhesives are typically supplied in cartridge form (50 ml cartridges being preferred) and are mixed within the nozzle of an injector gun on application. Epoxy based adhesives are free-flowing, have a low viscosity, and exhibit rapid cure at room temperature. By mixing the two-part adhesive on application it is possible to use adhesives with very low working lives, for example a working life of only a few minutes. Such adhesives could not be used with known sealing caps, which require application before assembly of the cap over the fastener end and/or by hand.

A suitable alternative material for the sealing material is a sealant material such as a two-part polysulphide based sealant or silicone based sealant. The sealing material is thus typically an elastomer. A suitable polysulphide based sealant is MC-238 Class A/B, produced by Chemetall™. Two-part sealants can be supplied within a cartridge for application via an applicator gun, and are typically mixed within the cartridge before delivery via the nozzle of the gun. Such sealants typically have a much longer cure time than two-part adhesives. In particular, the time taken to achieve a robust seal capable of withstanding accidental knocks etc may be 12 hours or more, compared to approximately 1 hour for an epoxy adhesive.

The inner cap member may or may not abut the fastener. If it abuts the fastener then it may abut the fastener via a plurality of ribs projecting from an inner surface of the inner cap member.

The fastener may project from the structure or it may be countersunk within the structure.

A third aspect of the invention provides a kit of parts for forming a sealed cavity around one end of a fastener, the kit including: an inner cap member having an annular base terminating at an edge which surrounds an opening into an air cavity for enclosing the one end of a fastener; an outer cap member having an annular skirt or flange, wherein the outer cap member is arranged to be fitted over the inner cap member with the annular skirt or flange and annular base between them defining an annular sealing cavity (and optionally the annular skirt or flange extends radially outwardly away from the annular base), the outer cap member further comprising a sealing material inlet, wherein the outer cap member has an inner surface formed with a first locking feature, and the inner cap member has an outer surface formed with a second locking feature which is arranged to form a snap-fit joint with the first locking feature when the outer cap member is fitted over the inner cap member; and a sealing material injection device having a nozzle arranged to interconnect with the sealing material inlet to direct a flow of curable sealing material into the annular sealing cavity.

By providing the cap separately from the curable sealing material, the sealing material can be a quick cure sealing material of the type which has a short working life, since it is applied directly to the assembled cap, optionally via a static mixing nozzle. The kit of parts can be used to form the joint of the second aspect, and thereby achieve the associated benefits. The cap may comprise a cap according to the first aspect.

The injection device may be powered manually, electrically, or by compressed air. The injection device may be arranged to deliver a fixed volume of sealing material to thereby ensure a controlled and consistent application process.

The curable sealing material may be a two-part adhesive or sealant material, the two parts of which are mixed together in the nozzle of the injection device before injection into the cap. Alternatively, the two parts may be pre-mixed before delivery via the nozzle of the injection device. The curable sealing material preferably comprises an epoxy based adhesive that has good flow characteristics, most preferably a two-part epoxy based adhesive such as Scotch-Weld™ 7256 B/A, produced by 3M™. Such two-part adhesives are supplied in the form of cartridges (50 ml cartridges, or larger cartridges, being preferred) which can be loaded into the injection device. The two parts of the adhesive are mixed within the nozzle of the injector gun on application.

Epoxy based adhesives are free-flowing, have a low viscosity, and exhibit rapid cure at room temperature. By mixing the two-part adhesive on application it is possible to use adhesives with very short working lives, for example a working life of only a few minutes. Such adhesives could not be used with known sealing caps, which require application before assembly of the cap over the fastener end and/or by hand.

A suitable alternative material for the sealing material is a sealant material such as a two-part polysulphide based sealant or manganese dioxide based sealant. A suitable polysulphide based sealant is MC-238 Class A/B, produced by Naftoseal™. Two-part sealants can be mixed within an applicator gun before delivery, as discussed above, but typically have a much longer cure time than two-part adhesives. In particular, the time taken to achieve a robust seal capable of withstanding accidental knocks etc may be 12 hours or more, compared to approximately 1 hour for an epoxy adhesive.

A fourth aspect of the invention provides a method of installing a cap to form a sealed cavity around one end of a fastener passing through a structure, the cap comprising: an inner cap member having an annular base terminating at an edge which surrounds an opening into an air cavity for enclosing the one end of a fastener; an outer cap member having an annular skirt or flange which optionally extends radially outwardly away from the annular base, the annular skirt or flange and annular base between them defining an annular sealing cavity, wherein the outer cap member has an inner surface formed with a first locking feature, and the inner cap member has an outer surface formed with a second locking feature which forms a snap-fit joint with the first locking feature; and a sealing material inlet comprising an opening in the outer cap member that is in fluid communication with the annular sealing cavity, the method including: installing the cap over the one end of the fastener so that it is enclosed within the air cavity of the inner cap member and the edge of the annular base abuts the structure; injecting curable sealing material into the annular sealing cavity via the sealing material inlet so that the curable sealing material contacts the structure; and curing the curable sealing material to seal the air cavity. The cured sealing material may thus form a continuous void-free seal (bond) around the air cavity.

The step of curing the curable sealing material may also include adhering the cap to the structure.

The cap may comprise a cap according to the first aspect, and the method may result in a joint according to the second aspect. The method may use a kit of parts according to the third aspect.

The structure preferably comprises a structural component of an aircraft, more preferably a structural component of an aircraft wing, and most preferably a structural component of an aircraft wing which forms a boundary wall of a fuel tank. The structure preferably comprises a composite structural component or a hybrid assembly of composite and metallic structural components, and the fastener comprises a metal fastener. In such cases a lightning strike may be particularly likely to occur at the fastener or in an area immediately surrounding the fastener. The structure typically comprises a pair of structural parts which are joined together by the fastener. In such aircraft applications the air cavity of the cap provides an air pocket which will safely contain out-gassing or sparking events that occur in the event of a lightning strike. The sealing material also provides a fluid tight seal around the end of the fastener, thus preventing fuel leakage into the inner air cavity.

The curable sealing material preferably comprises an epoxy based adhesive, as described above in relation to the third aspect.

A further aspect of the invention provides a method of assembling the cap of the first aspect, the method comprising fitting the outer cap member over the inner cap member, the inner and outer cap member moving together in a fitting direction as the outer cap member is fitted over the inner cap member, wherein the inner cap member exerts a camming force on the first locking feature which causes the first locking feature to move laterally away from the fitting direction and then snap back to form the snap-fit joint with the second locking feature.

Any of the optional, or desirable, features discussed above or below in relation to any of the aspects of the invention may be applied to any other aspect, either individually or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
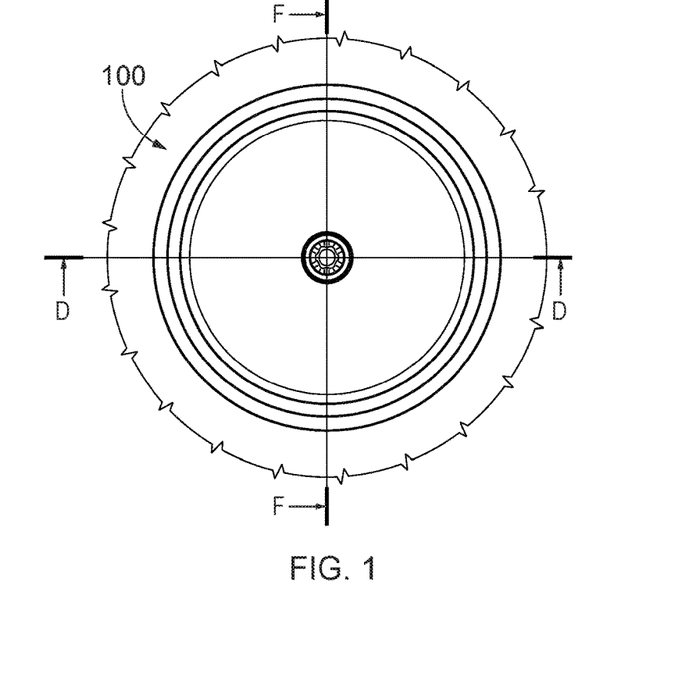
FIG. 1 is a plan view of a nut cap according to a first embodiment of the invention.
Figure 2:
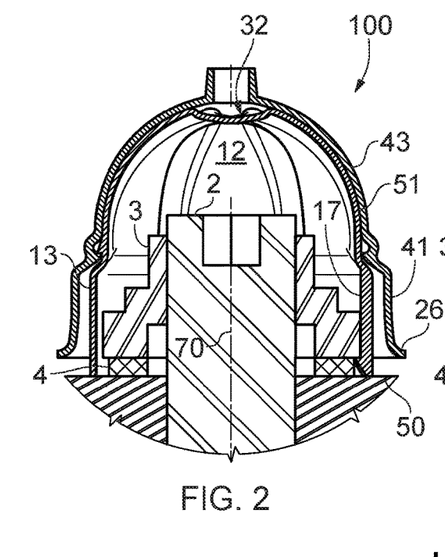
FIG. 2 is a cross-sectional view of the nut cap of FIG. 1 taken along a line D-D.
Figure 3:
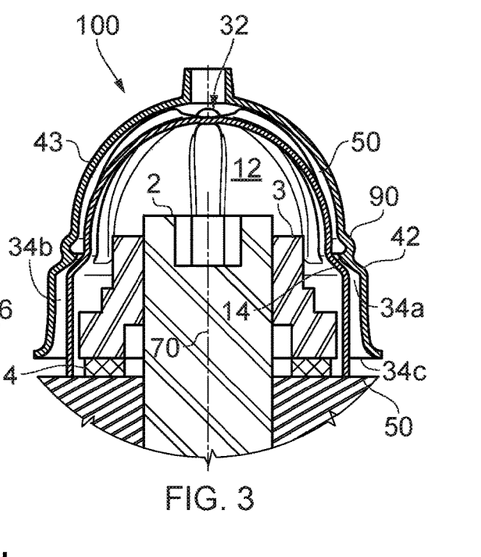
FIG. 3 is a cross-sectional view of the nut cap of FIG. 1 taken along a line F-F.

FIGS. 1-3 show an injectable nut cap 100 according to a first embodiment of the present invention. The nut cap includes an inner cap member 10 (shown in FIGS. 4-6) and an outer cap member 20 (shown in FIGS. 7-9). The inner and outer cap members 10, 20 are injection moulded from a thermoplastic material such as glass-filled polyetherimide (PEI). A suitable glass-filled PEI is Ultem™ 2400, which includes 40% glass fibres by volume. The inner and outer cap members may alternatively be made by moulding, by an additive manufacturing process, or by any other suitable process.

The inner cap member 10 is a generally thin-walled dome-shaped member, with a correspondingly dome-shaped inner air cavity 12 which encloses the tail end of a fastener protruding from a structural element, which in this embodiment is a composite aircraft structural component 50, but may be a hybrid composite-metallic component.

Figure 4:
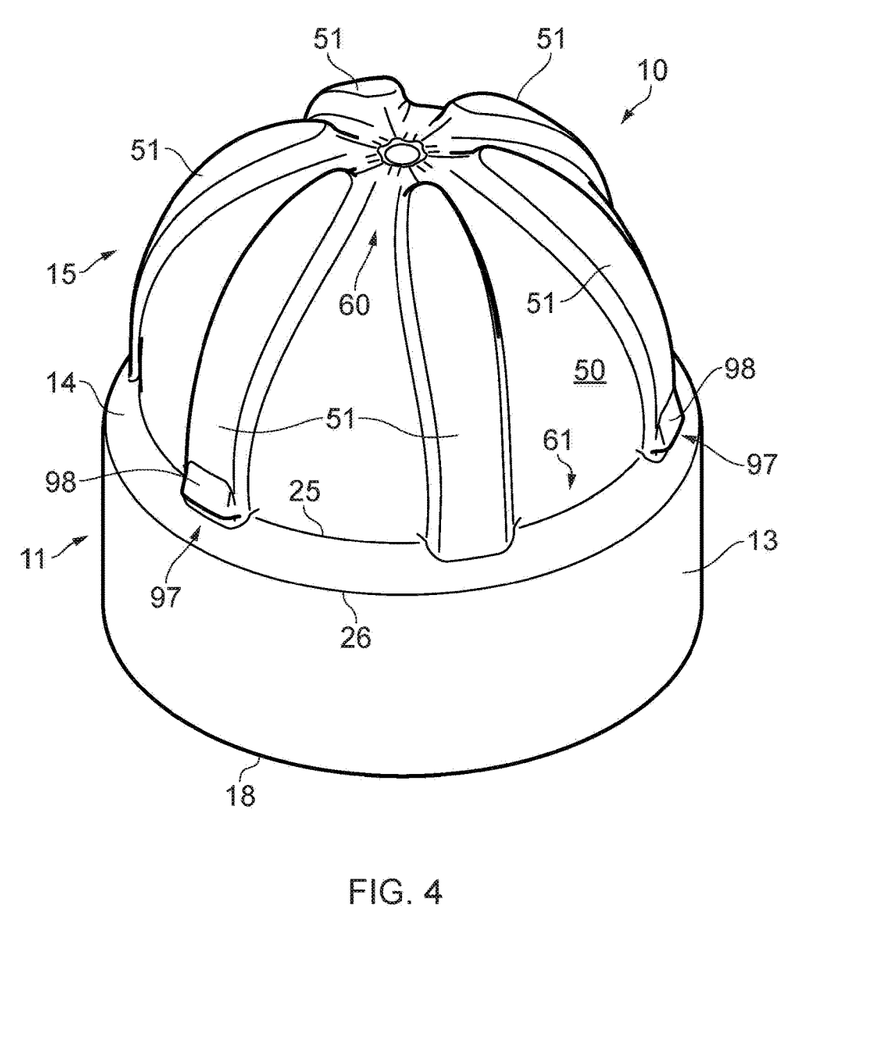
FIG. 4 is an isometric view of the inner cap member of the cap of FIG. 1.
Figure 5:
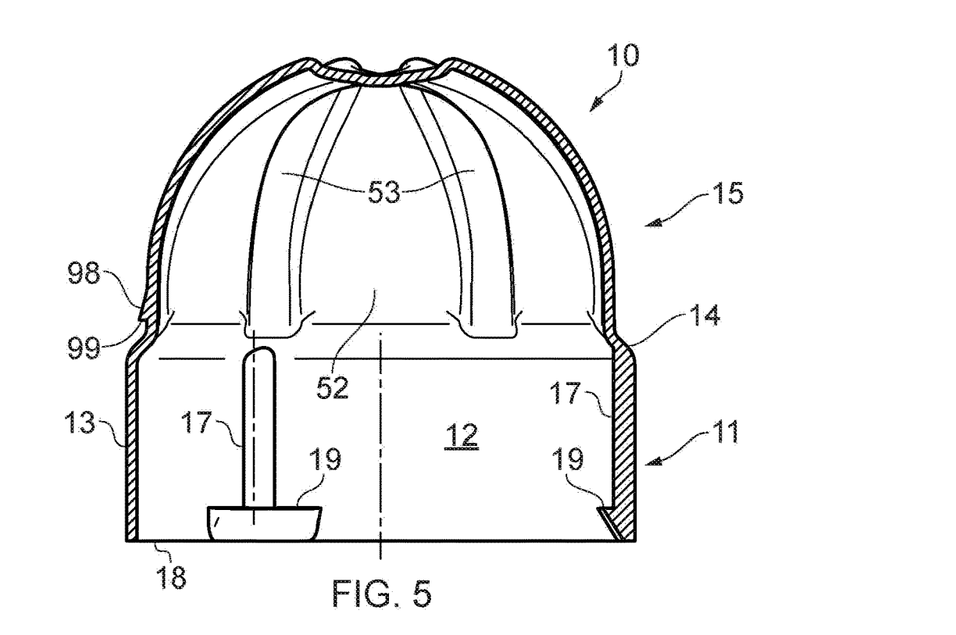
FIG. 5 is a cross-sectional view of the inner cap member of FIG. 4 taken along a line A-A in FIG. 6.
Figure 6:
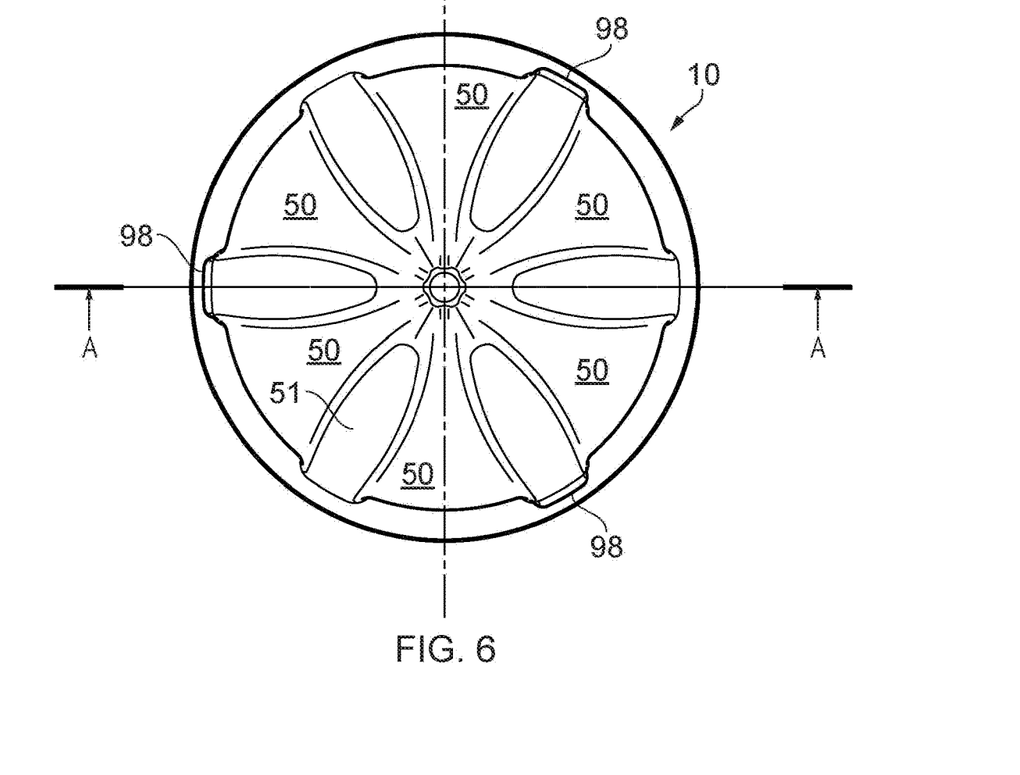
FIG. 6 is a plan view of the inner cap member of FIG. 4.

Referring to FIGS. 4-6, the inner cap member 10 is generally made up of an annular base 11 and a domed portion 15. The base 11 has a cylindrical portion 13 with a cylindrical outer surface. A frustoconical shoulder 14 joins the cylindrical portion 13 to the domed portion 15 which extends from the shoulder to an apex. An outer diameter of the inner cap reduces at the shoulder 14 so the domed portion 15 has a smaller outer diameter than the annular base 13. The outer surfaces of the shoulder 14 and the domed portion 15 meet at a concave corner 25 (labelled in FIG. 4) and the outer surfaces of the shoulder 14 and the annular base 13 meet at a convex corner 26.

In the installed state of FIGS. 2 and 3, the exposed inboard edge 18 of the cylindrical portion 13 abuts the structural element 50 to fully encapsulate the tail end of the fastener within the air cavity 12. The fastener comprises a nut 3 screwed onto a bolt 2, and a washer 4. The cylindrical portion 13 of the base has mechanical locking features for providing a mechanical connection between the inner cap member 10 and the fastener. In this example, the washer 4 has a reduced diameter compared with the nut 3 so that the overhanging part of the nut mates with three snap-fit projecting hooks 19 protruding from the inner surface of the cylindrical portion 13. These hooks 19 prevent the cap from being forced away from the structure 50 by the pressure of sealant material as it is injected. The inner cap member also has three axially extending ribs 17 which grip the sides of the nut 3 as shown in FIG. 2.

Figure 3A:
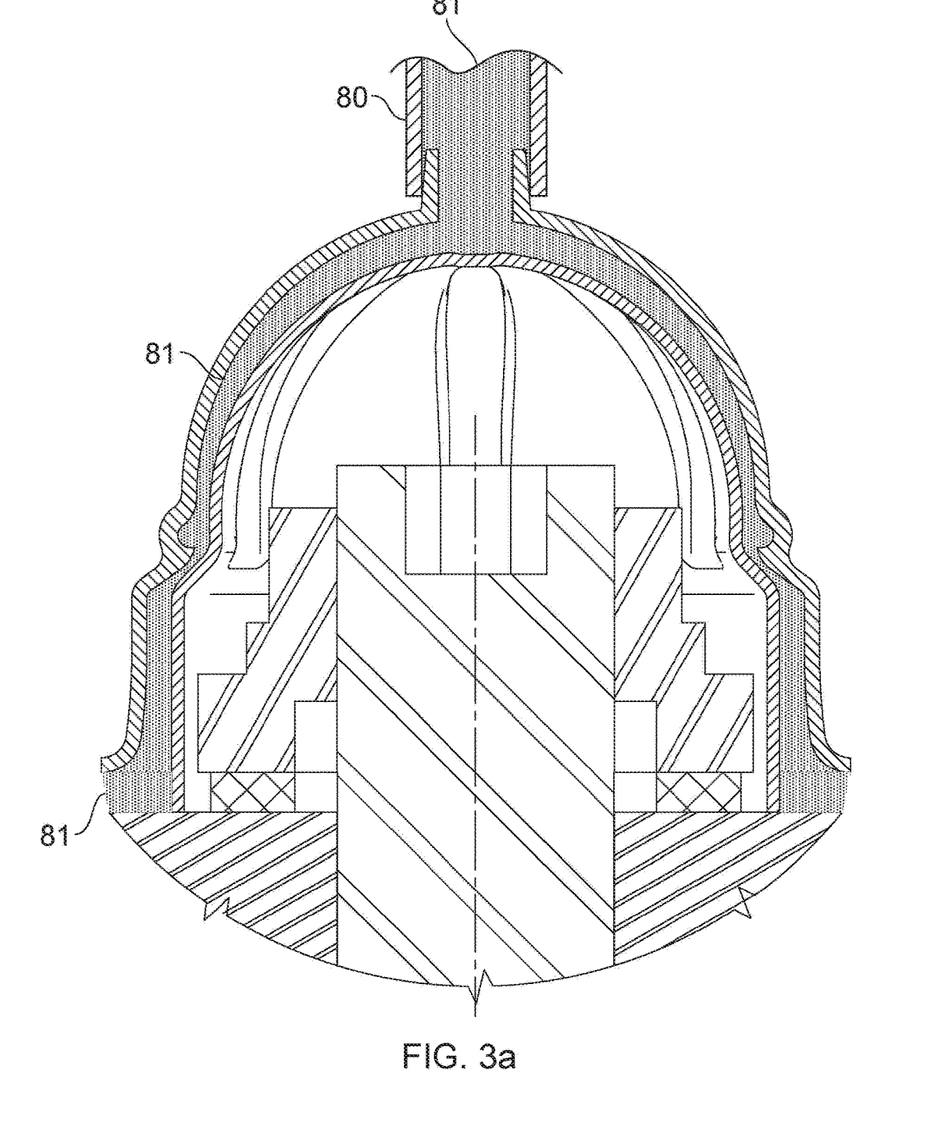
FIG. 3a is a sectional view of the nut cap of FIG. 1 showing sealing material being injected by a nozzle.
Figure 7:
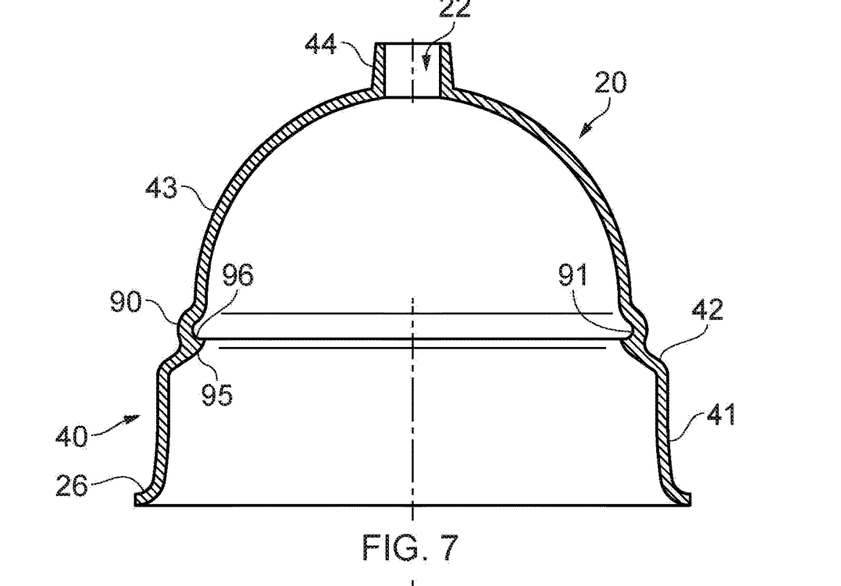
FIG. 7 is a cross-sectional view of the outer cap member of FIG. 8 taken along a line B-B in FIG. 8.
Figure 8:
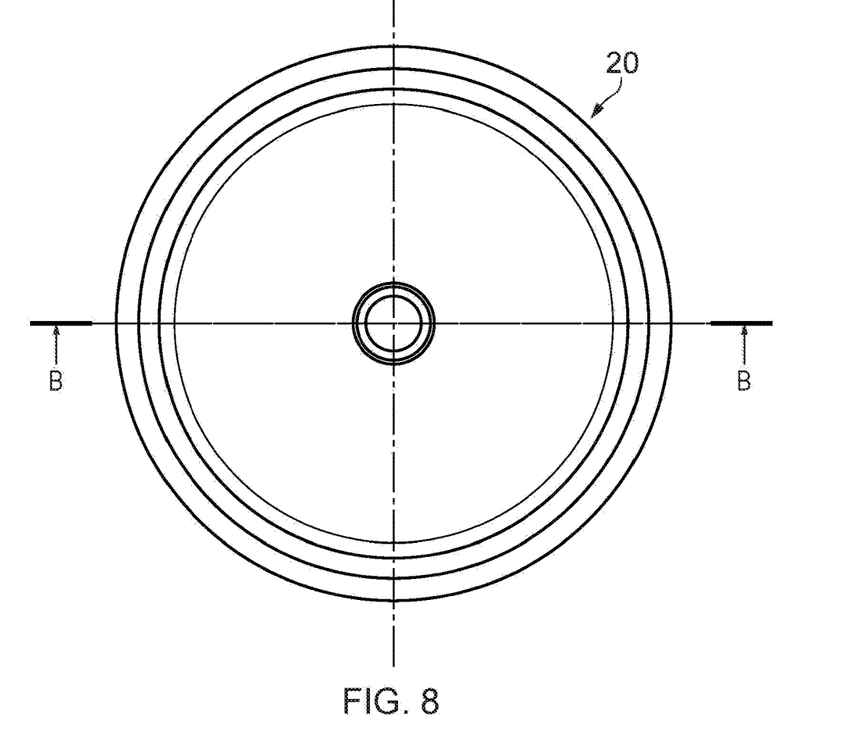
FIG. 8 is a plan view of the outer cap member of FIG. 9.
Figure 9:
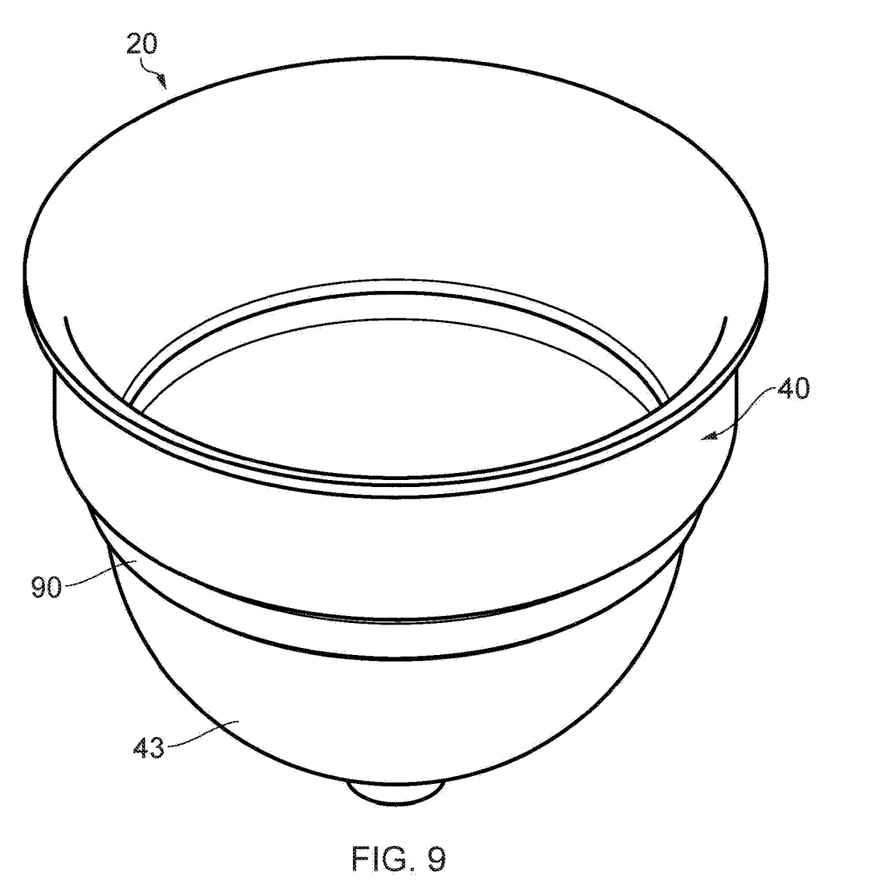
FIG. 9 is an isometric view of the outer cap member of the cap of FIG. 1.

Referring to FIGS. 7-9, the outer cap member 20 is also a generally thin-walled dome shaped member, and is shaped to fit over the inner cap member 10. The outer cap member 20 is generally made up of an annular skirt 40 and a smaller diameter domed outboard portion 43. The annular skirt 40 has a cylindrical portion 41, a shoulder 42, and a flared lip 26 at its free edge. A tapered boss 44 at the apex of the domed outboard portion 43 contains an opening 22. The outer diameter of the boss 44 is sized to be received within the nozzle 80 of a sealing material injector gun as shown in FIG. 3a. Fitting the nozzle 80 over the boss 44 is preferred (rather than vice versa) since it does not restrict the flow of sealant material and results in a less directional flow of sealant into the cap. Optionally the nozzle may interconnect with the boss via a bayonet fitting or similar.

The inner cap member has side walls with a substantially uniform wall thickness. The side walls are corrugated to form six outward-facing ridges 51 and channels or flutes 50 in an outer surface of the inner cap member and the same number of corresponding inward-facing ridges 52 and channels 53 in an inner surface of the inner cap member. The ridges 51 abut the inner surface of the domed portion 43 of the outer cap member as shown in FIG. 2 so that the sealing material cannot flow between the channels 50. Between the domed outboard portion 43 and the shoulder 42 the outer cap member 20 is also formed with an undulation 90 around its circumference where the cap 20 bulges outwardly in its outer surface and is formed with an annular recess 91 in its inner surface. Where the undulation 90 meets the shoulder 42 the inner surface of the outer cap member 20 is also formed with an annular bead which runs around its circumference. The annular bead has a ramp 95 and an undercut 96 which meets the ramp at a corner.

Locking features 97 are formed in the domed portion 15 at the base of three of the ridges 51, two of these locking features being visible in FIG. 4. Each locking feature 97 includes an angled ramp 98 which meets an undercut 99 at a corner as shown in FIG. 5.

The cap 100 is assembled by pushing the outer cap member 20 down onto the outer cap member in a fitting direction parallel with the cap axis 70. The ramp 95 engages the ramps 98 which exert a camming force on the ramp 95 causing the outer cap to deform laterally away from the fitting direction until the annular bead 95,96 clears the corner and snaps back to form three snap-fit joints. In the assembled cap the annular bead 95, 96 in the outer cap mates with the three locking features 97 in the inner cap to form three snap-fit joints which secure the outer cap member 20 in place. One of the three snap-fit joints is shown on the left-hand side of FIG. 2.

The sealing volume between the inner and outer cap members 10, 20 has three key regions: a reservoir 32; an annular sealing volume (or pocket) 34a-c between the skirt 40 and the base 11; and the channels 50 which interconnect the reservoir 32 and the annular sealing volume 34a-c.

The nozzle 80 delivers a continuous flow of sealing material 81 into the sealing volume via the opening 22. In the present embodiment a two-part epoxy based structural adhesive such as Scotch-Weld™ 7256 B/A, produced by 3M™, is preferred. This adhesive is supplied in cartridge form (50 ml cartridges being preferred) and mixed within the nozzle 80 on application by the injector gun. Such epoxy based adhesives are free-flowing, have a low viscosity, and exhibit rapid cure at room temperature. A suitable alternative material is a two-part polysulphide based sealant such as MC-238 Class A/B, produced by Naftoseal™.

The reservoir 32 is directly below the opening 22 so that it receives sealing material directly therefrom. The reservoir 32 serves to improve the flow of sealing material into the sealing volume 34a-c by providing a relatively low flow resistance, and also serves to provide an even, uniform flow into the channels 50. Once cured, the sealing material within the channels 50 serves to bond the inner cap member 10 and outer cap member 20 together, and adds structural rigidity to the cap 100.

The annular sealing volume has three parts shown in FIG. 3: an upper part 34a between the shoulders 14, 42; a cylindrical (or slightly flared) middle part 34b between the cylindrical portions 41, 13; and a lower part 34c between the base 11 and the lip 26.

The shoulder 42 extends radially outwardly away from a central axis 70 of the cap at a large acute angle to the cap axis 70, which is larger than the acute angle of the shoulder 14. Therefore the inner surface of the shoulder 42 extends radially away from the outer surface of the shoulder 14 at a small acute angle so that the upper part 34a of the annular sealing volume has a flared shape with a cross-sectional area which increases with distance from the opening 22. The lower part 34c of the annular sealing volume also has a flared shape due to the flared lip 26 such that its cross-sectional area increases with distance from the opening 22. The annular sealing volume 34a-c is open at its lower face such that the sealing material can flow outwardly from the annular sealing volume and into contact with the structural element 50.

The lip 26 is axially offset from the base edge 18 of the inner cap member 10. This arrangement ensures that the outer cap member 20 does not clash with features of the structural element 50, such as ramps or radii (fillets), in the event that the fastener is located very close to such features. Such a potential clash is not uncommon in aircraft structures, where it is possible for the outer edge of a fastener to be located only 1.6 mm from the edge of a fillet with a 5 mm radius. It also ensures that the seal is able to accommodate small surface feature deviations in the structural element 50, and is sufficiently thick to have a degree of flexibility once cured.

Referring to FIG. 4, each channel 50 has an inlet 60 arranged to receive the flow of the curable sealing material 81 from the sealing material inlet and an outlet 61 arranged to feed the flow of curable sealing material into the upper part 34a of the annular sealing volume. The channels 50 terminate at the shoulder 14 so that their outlets 61 are set back in an axial direction from the edge 18 of the base 11.

During installation, the cap 100 is first placed in the position shown in FIGS. 2 and 3, with the tail end (or alternatively the head end) of a fastener enclosed within the air cavity 12. A nozzle 80 of a sealing material injector gun is then fitted as shown in FIG. 3a to create a temporary seal therebetween. Pre-mixed sealing material 81 is then injected from the nozzle 80 into the reservoir 32, where it collects. When the reservoir 32 is full it overflows, causing an evenly distributed flow of sealing material into the channels 50. Once the channels 50 are filled the pressure of the sealing material 81 increases to a level at which it is forced through the outlets 61 of the channels and into the annular sealing volume 34a-c. The sealing material completely fills the annular sealing volume 34a-c until it flows out and into contact with the structure 50, at which point the flow of sealing material from the nozzle 80 is stopped.

After injection of the curable sealing material 81 into the sealing volume the nozzle is removed and the injected sealing material is left to cure. On curing, it provides a strong adhesive bond between the cap 100 and structure 50, and also between the inner and outer cap members 10, 20. When the sealing material is an epoxy based adhesive as discussed above, it may cure to handling strength (i.e. a degree suitable to provide sufficient strength to withstand knocks or similar from assembly workers) within an hour or so. This compares to handling strength cure times of 12 hours or more for polysulphide or manganese dioxide based sealants.

The cured injected sealing material 81 also serves to fully seal the air cavity 12. Thus, trapped air within the air cavity 12 can provide a safe environment within which sparking and out-gassing events caused during a lightning strike can be contained. Ingress of fuel, water or other contaminants into the air cavity 12 is also prevented.

The sealing material injection method of the present invention avoids the accumulation of air pockets (i.e. entrapment of air) within the sealing volume 33a-c, since a uniformly distributed coverage of sealing material is achieved. Such air pockets are particularly undesirable because they may provide sites for uncontrolled sparking or out-gassing events and also cause the seal to be compromised and a consequent leakage of fuel through the fastener joint.

The series of channels 50 present low resistance to flow so the sealing material can flow more freely from the reservoir 32 into the annular sealing volume 33a-c. Once cured, the sealing material 81 within the channels 50 serves to bond the inner cap member 10 and outer cap member 20 together, and adds structural rigidity to the cap 100.

As can be seen in FIG. 3, the depth of each channel 50 gradually reduces in the direction of flow. As can be seen in FIGS. 4 and 6, the circumferential width of each channel 50 also increases as it extends towards the annular sealing volume in the direction of flow. This encourages the streams of sealing material from the channels to merge as they exit the channels 50 and enter the annular sealing volume 34a-c.

The annular sealing volume 34a-c is open at its lower face such that the sealing material 81 can flow outwardly from the sealing volume and into contact with the structural element 50 as shown in FIG. 3a. The flared shape of the annular sealing volume 34a-c provides a large adhesion area for the sealing material 81, which, once cured, acts to seal the cap 100 to the structural element 50. Moreover, this large adhesion area is achieved within a relatively small footprint on the structural element.

FIGS. 10-13 show a kit of parts for forming an injectable nut cap according to a second embodiment of the present invention. The kit comprises an inner cap member 110 and an outer cap member 120. The inner cap member 110 is generally made up of a cylindrical base portion 113, and a domed portion 116 which extends from the base portion 113 to a planar apex 117.

Figure 12:
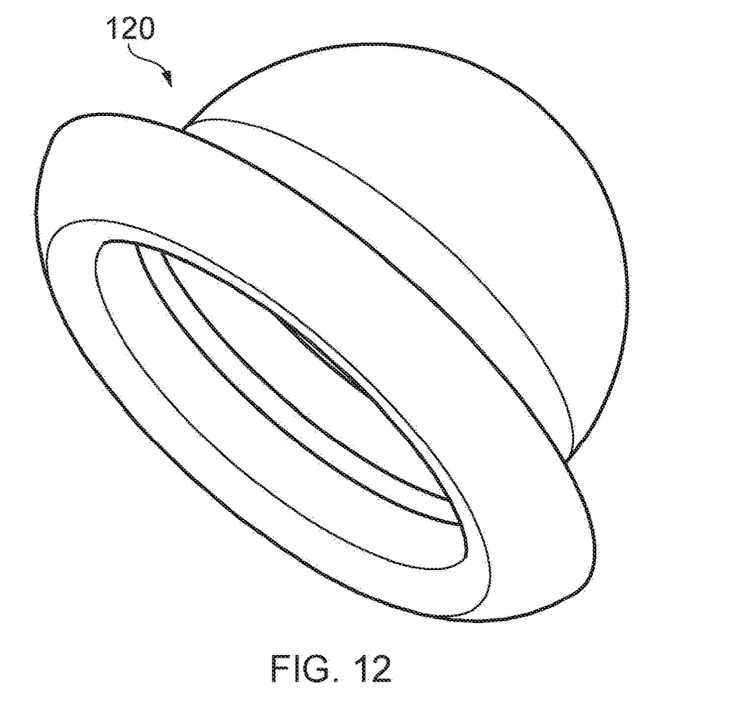
FIG. 12 is an isometric view of an outer cap member of the nut cap according to the second embodiment of the invention.
Figure 13:
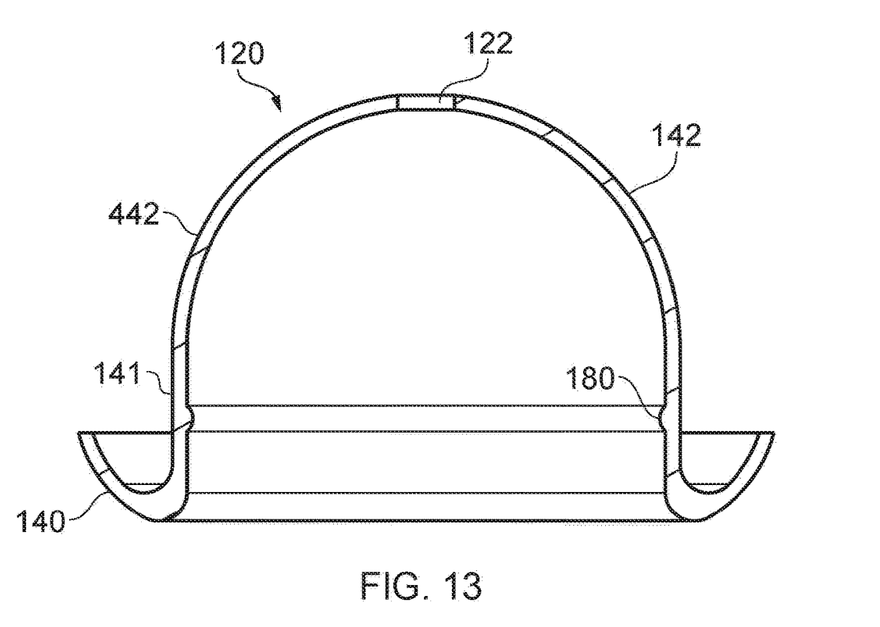
FIG. 13 is a section view of the outer cap member of FIG. 12.

The outer cap member 120 is also a generally thin-walled dome shaped member, and is shaped to fit over the inner cap member 110. The outer cap member 120 is generally made up of an annular flange 140, a cylindrical base 141, and a domed outboard portion 142. The domed outboard portion 142 contains an opening 122 sized to interconnect with the nozzle of a sealing material injector gun (not shown).

Figure 10:
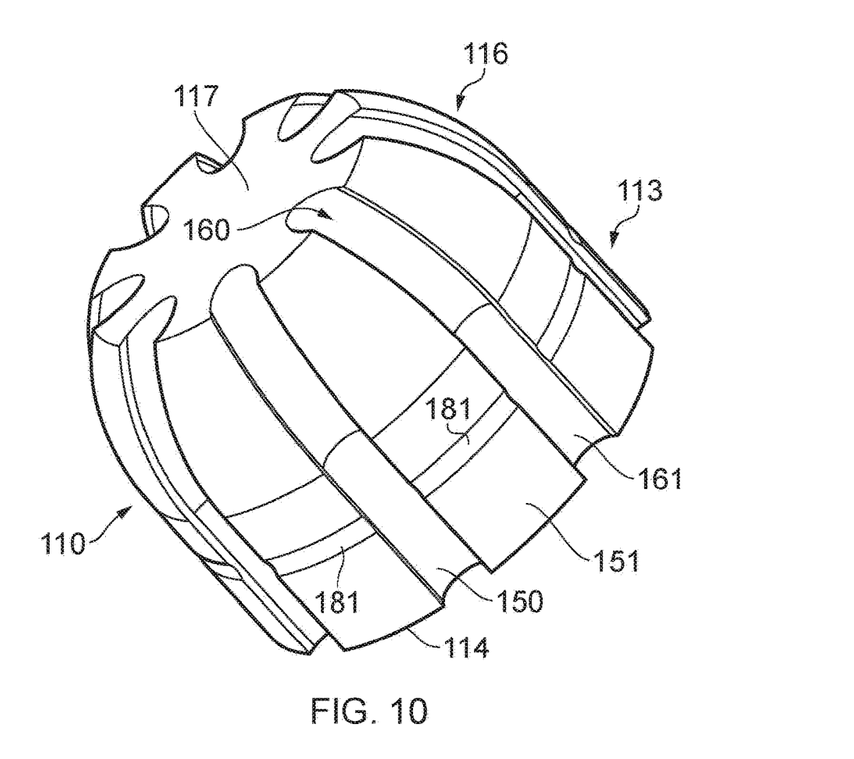
FIG. 10 is an isometric view of an inner cap member of a nut cap according to a second embodiment of the invention.
Figure 11:
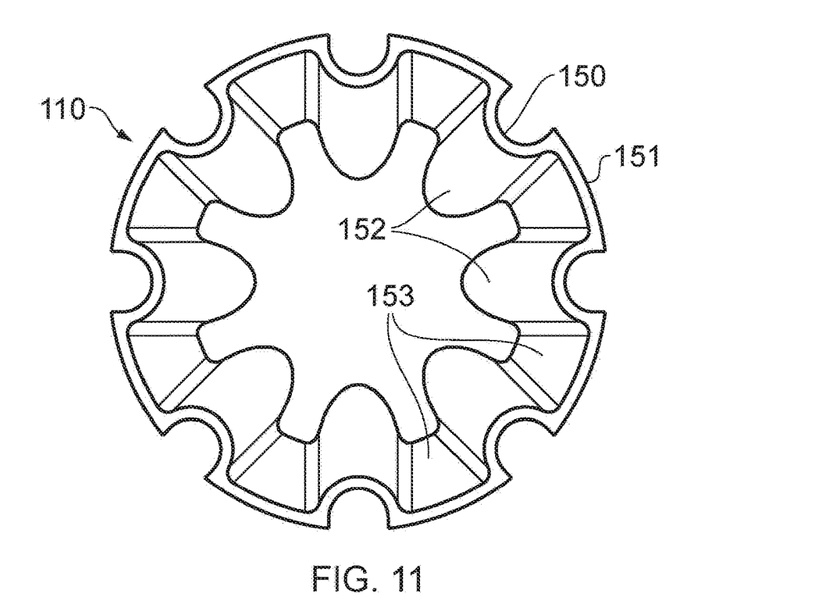
FIG. 11 is an under side view of the inner cap member of FIG. 10.

The inner cap member has side walls with a substantially uniform wall thickness. A plurality of outward-facing ridges 151 and channels 150 are formed in an outer surface of the inner cap member and the same number of corresponding inward-facing ridges 152 and channels 153 are formed in an inner surface of the inner cap member. The ridges 151 abut the inner surface of the outer cap member 120 when the cap is assembled so that the sealing material cannot flow between the channels.

Figure 14A:
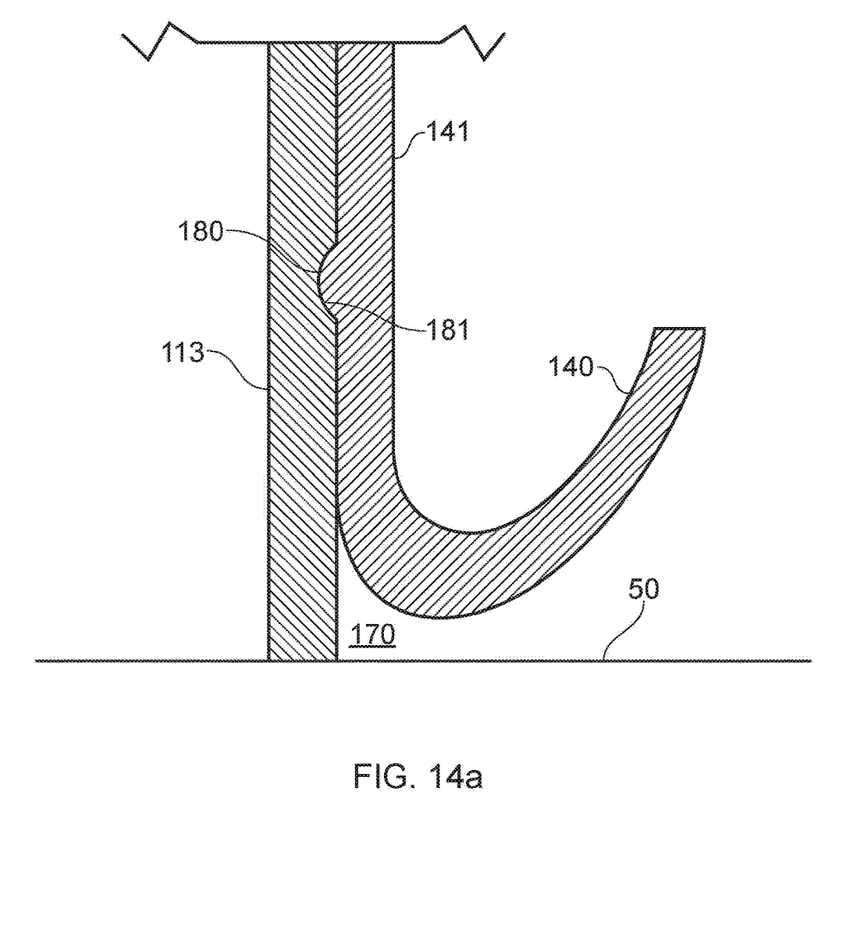
FIG. 14a is an enlarged sectional view of part of the nut cap of the second embodiment of the invention in an installed state where it meets a structure.

When assembled as shown in FIG. 14a, a small annular sealing volume (or pocket) 170 is formed between a curved radius of the annular flange 140 and the base 113 of the inner cap member. Referring to FIG. 10, each channel 150 has an inlet 160 arranged to receive the flow of curable sealing material from the sealing material inlet and an outlet 161 arranged to feed the flow of curable sealing material into the annular sealing volume 170. Unlike the previous embodiment, the channels 150 terminate at the edge 114 of the base 113. The channels 150 have an approximately semi-circular sectional shape which presents a low resistance to flow. The depth and width of each channel 150 remains substantially constant along its length.

The inner surface of the base 141 of the outer cap member is formed with an annular projection 180 which is received as a snap fit in a corresponding recess 181 in the outer surface of the inner cap member in order to secure the cap members together before the sealant cures.

Figure 14B:
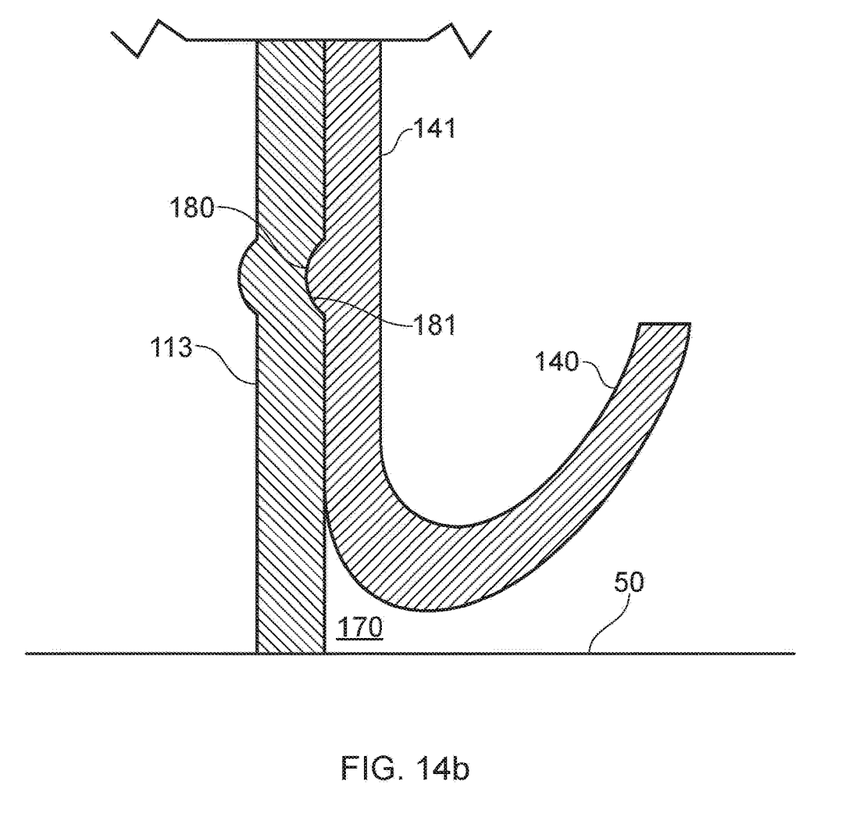
FIG. 14b is an enlarged sectional view of part of the nut cap of the second embodiment of the invention showing an alternative structure for the annular snap-fit groove in the inner cap member.
Figure 14C:
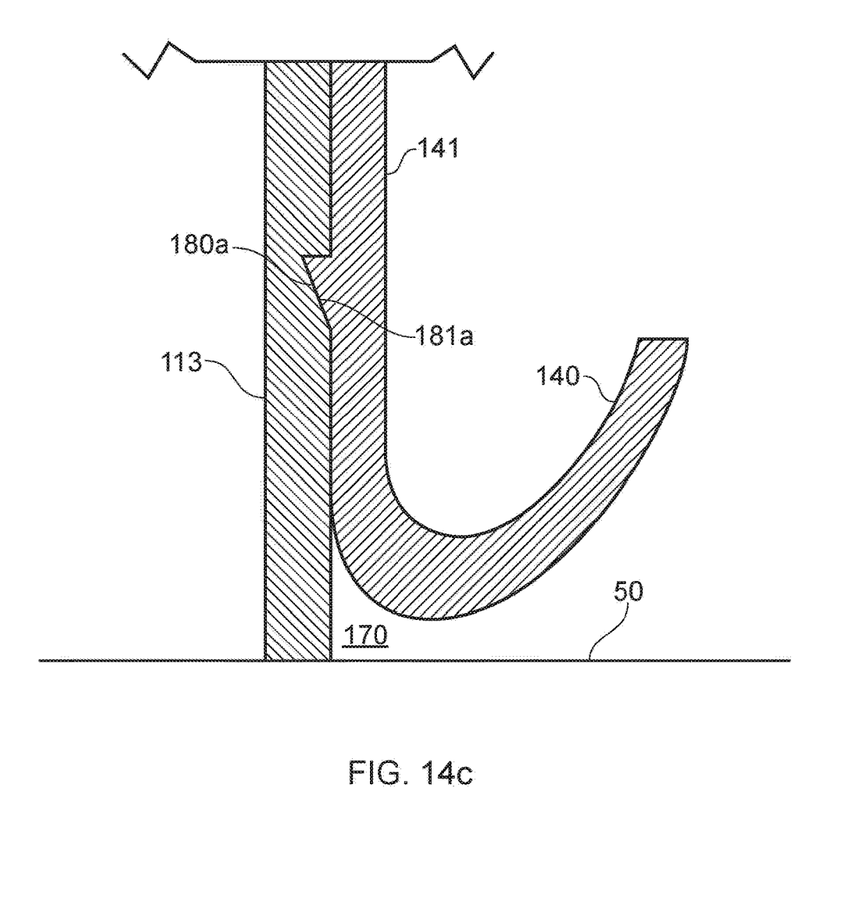
FIG. 14c is an enlarged sectional view of part of the nut cap of the second embodiment of the invention showing an alternative snap-fit joint with asymmetrical locking features.

In the example of FIG. 14a the inner cap member has a reduced wall thickness at the recess or groove 181. FIG. 14b shows an alternative structure for the annular snap-fit groove 181 in which the inner cap member has an undulating form so the wall thickness does not change.

Unlike the first embodiment of FIGS. 1-9, the snap-fit locking features 180, 181 in the embodiment of FIGS. 10-14b have a symmetrical semi-circular sectional profile as shown in FIGS. 14a and 14b. In an alternative embodiment the features 180, 181 may be formed with a hooked asymmetrical sectional profile 180a, 181a as shown in FIG. 14c, similar to the annular bead 95, 96 and locking feature 97 in the embodiment of FIGS. 1-9 with a ramp meeting an undercut at a corner.

In the embodiments of the invention discussed above the ridges and channels are formed in the inner cap member, and the outer cap member has a smooth outer surface. This is preferred since the smooth outer surface of the outer cap member does not attract dirt and has a profile with less impact on the flow of water or liquid over the cap. However in an alternative embodiment (not shown) the outer cap member instead of the inner cap member may be corrugated to form the ridges and channels.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around one end of a fastener, the cap comprising:
   an inner cap member having an annular base terminating at an edge which surrounds an opening into an air cavity for enclosing the one end of a fastener;
   an outer cap member having an annular skirt or flange, the annular skirt or flange and annular base between them defining an annular sealing cavity; and
   a sealing material inlet comprising an opening in the outer cap member that is in fluid communication with the annular sealing cavity, the opening being arranged to interconnect with a sealing material injection device to provide a flow of curable sealing material from the sealing material inlet into the annular sealing cavity,
   wherein the outer cap member has an inner surface formed with a first locking feature, and the inner cap member has an outer surface formed with a second locking feature which forms a snap-fit joint with the first locking feature.

2. The cap of claim 1 wherein the first locking feature is an annular projection in the inner surface of the outer cap member and the second locking feature is a recess in the outer surface of the inner cap member which receives the annular projection to form the snap-fit joint.

3. The cap of claim 1 wherein the inner cap member is formed with a plurality of locking features each forming a respective snap-fit joint, and wherein a plurality of flow channels are provided between the snap-fit joints to enable the curable sealing material to flow into the annular sealing cavity between the snap-fit joints.

4. The cap of claim 3 wherein the outer surface of the inner cap member is formed with a plurality of second locking features each forming a respective snap-fit joint.

5. The cap of claim 4 further comprising a plurality of channels formed in the outer surface of the inner cap member, each channel being in fluid communication with the opening of the sealing material inlet and the annular sealing cavity, wherein the channels are separated by ridges which abut the inner surface of the outer cap member, and wherein each one of the plurality of second locking features is formed in a respective one of the ridges.

6. The cap of claim 1 wherein the first locking feature extends around a full circumference of the inner surface of the outer cap member.

7. The cap of claim 1 wherein the first locking feature comprises an angled ramp and an undercut which meets the ramp at a corner.

8. The cap of claim 7 wherein the second locking feature comprises an angled ramp and an undercut which meets the ramp at a corner, and wherein the undercut of the first locking feature mates with the undercut of the second locking feature to form the snap-fit joint.

9. The cap of claim 1 wherein the second locking feature comprises an angled ramp and an undercut which meets the ramp at a corner.

10. The cap of claim 1 wherein the annular base of the inner cap member has a cylindrical outer surface.

11. The cap of claim 1 wherein the inner cap comprises a domed portion, and a shoulder between the annular base and the domed portion where an outer diameter of the inner cap reduces, wherein the shoulder and the domed portion have outer surfaces which meet at a concave corner, and the shoulder and the annular base have outer surfaces which meet at a convex corner.

12. The cap of claim 11 wherein the (or each) second locking feature is formed in the domed portion.

13. A method of assembling the cap claim 1, the method comprising fitting the outer cap member over the inner cap member, the inner and outer cap member moving together in a fitting direction as the outer cap member is fitted over the inner cap member, wherein the inner cap member exerts a camming force on the first locking feature which causes the first locking feature to move laterally away from the fitting direction and then snap back to form the snap-fit joint with the second locking feature.

14. A joint comprising:
   a structure;
   a fastener passing through the structure;
   a cap according to claim 1, wherein the air cavity of the inner cap member encloses an end of the fastener and the edge of the inner cap member abuts the structure; and
   sealing material filling the annular sealing cavity of the cap and contacting the structure to seal the air cavity.

15. A kit of parts for forming a sealed cavity around one end of a fastener, the kit including:
   an inner cap member having an annular base terminating at an edge which surrounds an opening into an air cavity for enclosing the one end of a fastener;
   an outer cap member having an annular skirt or flange, wherein the outer cap member is arranged to be fitted over the inner cap member with the annular skirt or flange and annular base between them defining an annular sealing cavity, the outer cap member further comprising a sealing material inlet, wherein the outer cap member has an inner surface formed with a first locking feature, and the inner cap member has an outer surface formed with a second locking feature which is arranged to form a snap-fit joint with the first locking feature when the outer cap member is fitted over the inner cap member; and
   a sealing material injection device having a nozzle arranged to interconnect with the sealing material inlet to direct a flow of curable sealing material into the annular sealing cavity.

16. A method of installing a cap to form a sealed cavity around one end of a fastener passing through a structure, the cap comprising: an inner cap member having an annular base terminating at an edge which surrounds an opening into an air cavity for enclosing the one end of a fastener; an outer cap member having an annular skirt or flange, the annular skirt or flange and annular base between them defining an annular sealing cavity, wherein the outer cap member has an inner surface formed with a first locking feature, and the inner cap member has an outer surface formed with a second locking feature which forms a snap-fit joint with the first locking feature; and a sealing material inlet comprising an opening in the outer cap member that is in fluid communication with the annular sealing cavity, the method including:
   installing the cap over the one end of the fastener so that it is enclosed within the air cavity of the inner cap member and the edge of the annular base abuts the structure;
   injecting curable sealing material into the annular sealing cavity via the sealing material inlet so that the curable sealing material contacts the structure; and
   curing the curable sealing material to seal the air cavity.

* * * * *